United States Patent
Chen et al.

(10) Patent No.: US 10,599,717 B1
(45) Date of Patent: Mar. 24, 2020

(54) SYSTEM AND METHOD TO REPRESENT DATA POINTERS IN THE DISTRIBUTED CLUSTER ENVIRONMENT

(71) Applicant: EMC IP Holding Company LLC, Hopkinton, MA (US)

(72) Inventors: Sikan Chen, Shanghai (CN); Petr Olegovich Pleshachkov, Nootdorp (NL); Valery Maltsev, Delft (NL); Philip Arickx, Sint Amandsberg (BE)

(73) Assignee: EMC IP Holding Company LLC, Hopkinton, MA (US)

( * ) Notice: Subject to any disclaimer, the term of this patent is extended or adjusted under 35 U.S.C. 154(b) by 846 days.

(21) Appl. No.: 15/281,437

(22) Filed: Sep. 30, 2016

(51) Int. Cl.
　*G06F 16/00* (2019.01)
　*G06F 16/835* (2019.01)
　*G06F 16/84* (2019.01)
　*G06F 16/907* (2019.01)

(52) U.S. Cl.
　CPC .......... *G06F 16/8373* (2019.01); *G06F 16/86* (2019.01); *G06F 16/907* (2019.01)

(58) Field of Classification Search
　None
　See application file for complete search history.

(56) References Cited

U.S. PATENT DOCUMENTS

| 7,882,329 B2 * | 2/2011 | Friauf | G06F 3/061 711/117 |
| 2014/0195495 A1 * | 7/2014 | Akirav | G06F 3/0641 707/692 |

OTHER PUBLICATIONS

EMC Documentum xDB, Version 10.0, Manual, All Pages (Year: 2010).*
Louie, David "xDB 10.0: Introduction to Multi-node", http://www.community.emc.com/docs/DOC-7462, Jun. 22, 2010 (4 pages).

* cited by examiner

*Primary Examiner* — Son T Hoang
(74) *Attorney, Agent, or Firm* — Chamberlain, Hrdlicka, White, Williams & Aughtry

(57) ABSTRACT

In general the technology includes obtaining a detachable library, where the detachable library includes data files each of which are associated with a library scope identifier (ID). The technology further includes reattaching the detachable library to a node server, assigning a node scope ID and a cluster scope ID to each of the data files in the detachable library, creating a mapping index using the node scope IDs, the cluster scope IDs, and the library scope IDs, where each of mapping index entry in the mapping index is associated with a type, and processing a request from a client using the mapping index, wherein the request includes a cluster scope ID.

20 Claims, 17 Drawing Sheets

Library B - Index

| Type | Cluster Scope ID | Node Scope ID | Library Scope ID |
|---|---|---|---|
| Self | 201 | 51 | 1 |
| Self | 202 | 52 | 2 |
| Parent | 101 | 31 | 3 |
| Child | 301 | 71 | 4 |
| Child | 401 | 81 | 5 |
| Tree | 302 | 72 | 6 |
| Tree | 402 | 82 | 7 |

FIG. 6J

SYSTEM AND METHOD TO REPRESENT DATA POINTERS IN THE DISTRIBUTED CLUSTER ENVIRONMENT

BACKGROUND

Content may be stored in persistent storage and accessed by a content management system. In certain implementations, the persistent storage may be detached from the content management system and archived for long term storage. At some later point in time, the archived content may be required. In such scenarios, the archived content may be retrieved and associated with a new content management system. Because the archived content was originally created and/or stored using a different content management system, it may be difficult to obtain the archived content using the new content management system.

BRIEF DESCRIPTION OF DRAWINGS

FIGS. 6A-6J shows an example in accordance with one or more embodiments of the technology.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1A-7, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for creating a detachable library that may be readily attached to a new database, where the new database may easily access content in the detachable library. More specifically, two layers of indirect addressing are introduced: a library scope identifier (ID) and a cluster scope ID. By assigning each data file in the detachable library both a library scope ID, a node scope ID (i.e., an identifier assigned by the particular node server), and a cluster scope ID, the data files (and pointers therein) are decoupled from the database instance that created the detachable library. By using the three aforementioned IDs, file identifier collision is avoided when attaching the detachable library to the new database. Further, the using of the three aforementioned IDs permits efficient attachment of the detachable library to a new database as it does not require any modification of the file pointers that are included within the detachable library.

Figure 1A:
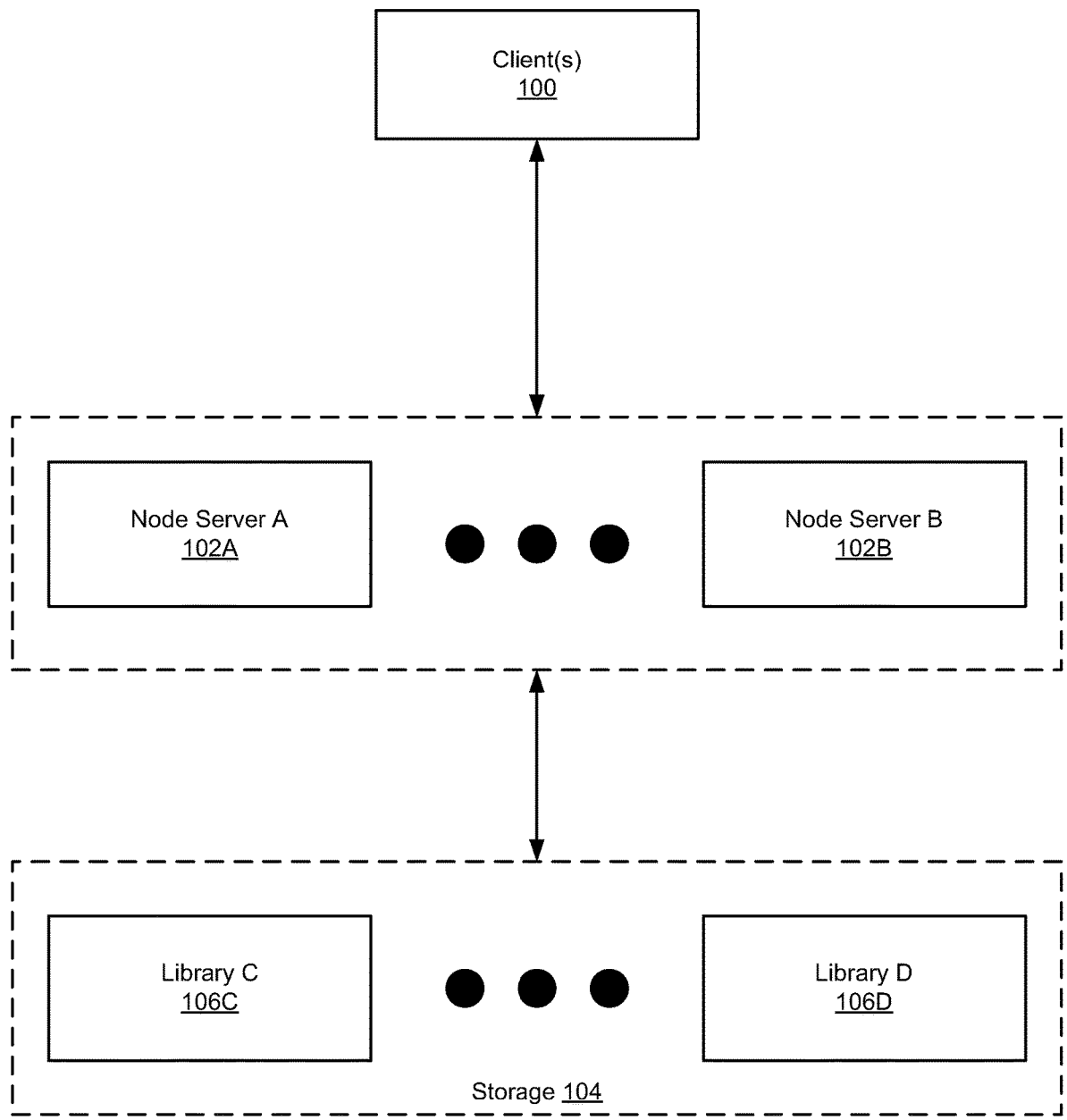
FIG. 1A shows an exemplary system in accordance with one or more embodiments of the technology.

FIG. 1A shows an exemplary system in accordance with one or more embodiments of the technology. The system includes one or more client systems (100), one or more node servers (102A, 102B), and a storage (104) with one or more libraries (106C, 106D). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system corresponds to any computing system (see e.g., FIG. 7) that includes functionality to issue requests (also referred to as queries) to the node servers (102A, 102B) and to receive a corresponding response(s) from the node servers after the request has been serviced.

Continuing with the discussion of FIG. 1A, the node servers include functionality to perform all or a portion of the methods shown in FIGS. 3-6J. The node servers may also include functionality to perform various actions (e.g., read, write, delete, modify, send, etc.) on the files stored in the libraries when servicing requests from the client systems (see e.g., FIGS. 3-6J). The node servers may provide database management services, such as detaching a library from a database and reattaching the library to another database.

Figure 6A:
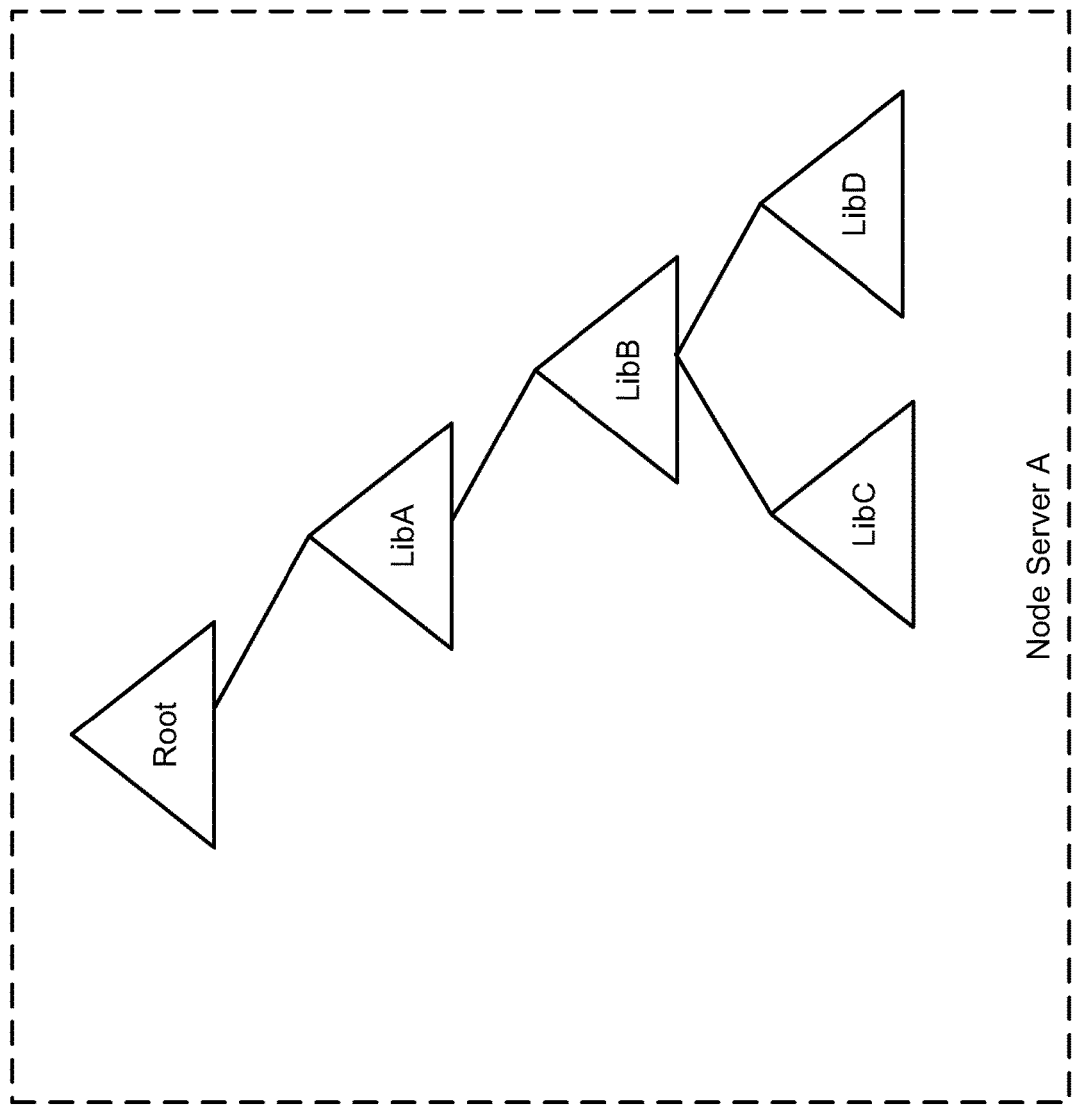
Figure 6B:
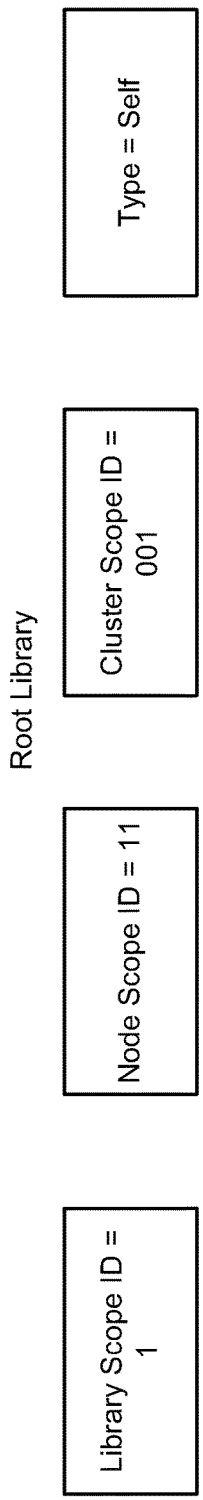
Figure 6C:
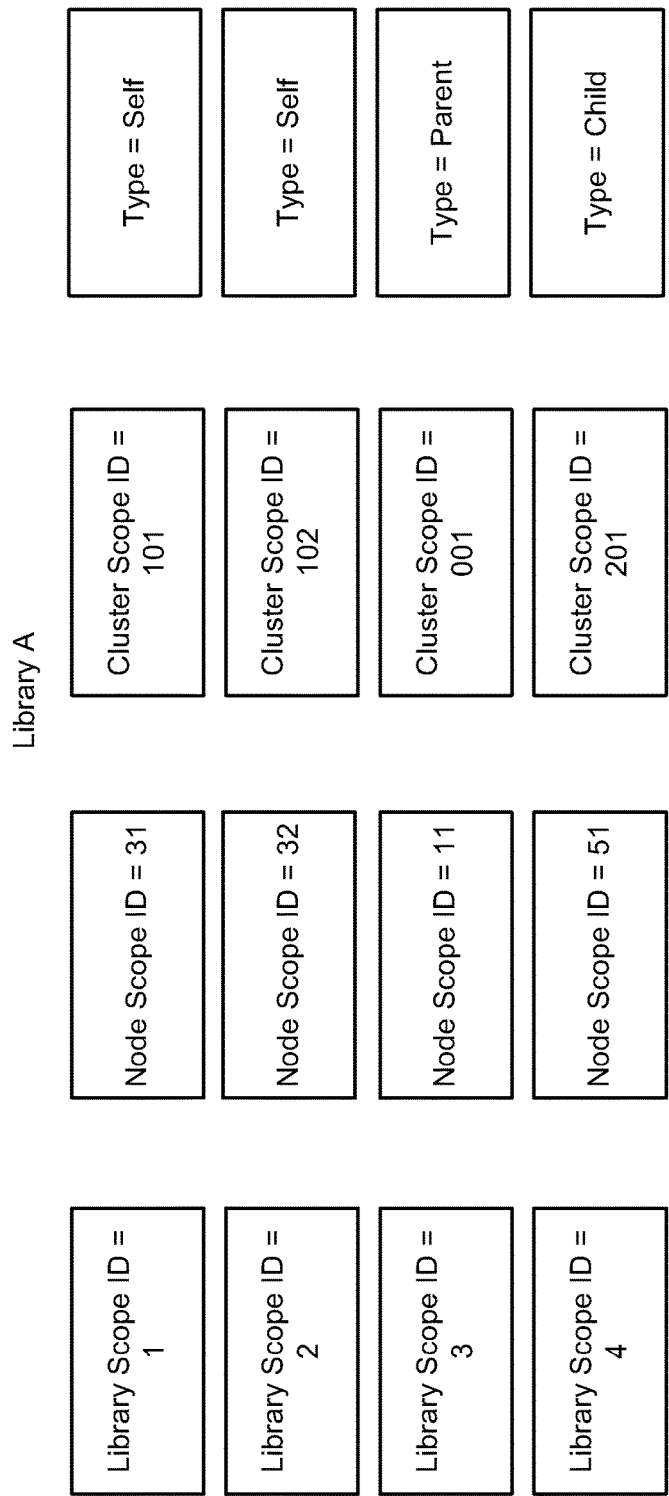
Figure 6D:
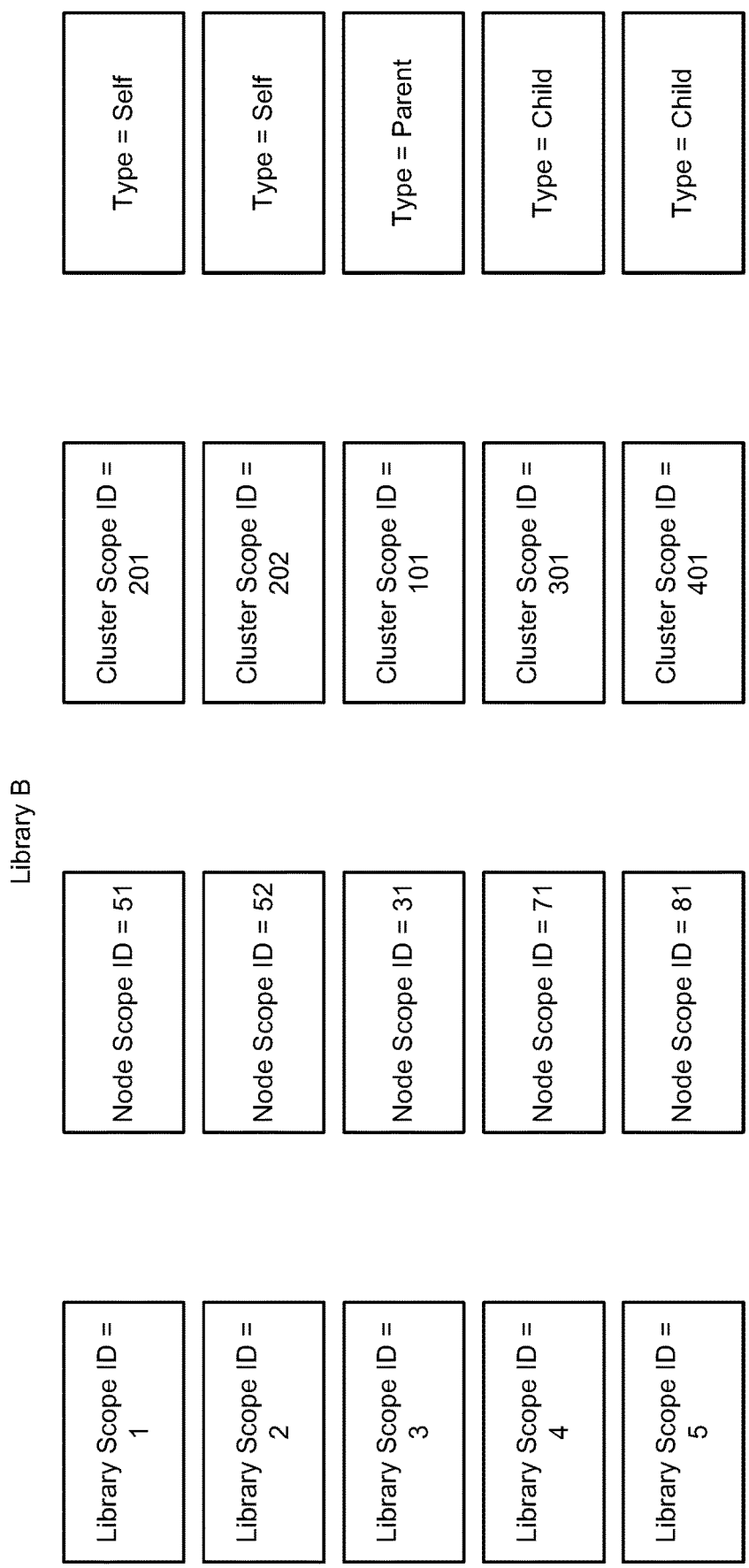
Figure 6E:
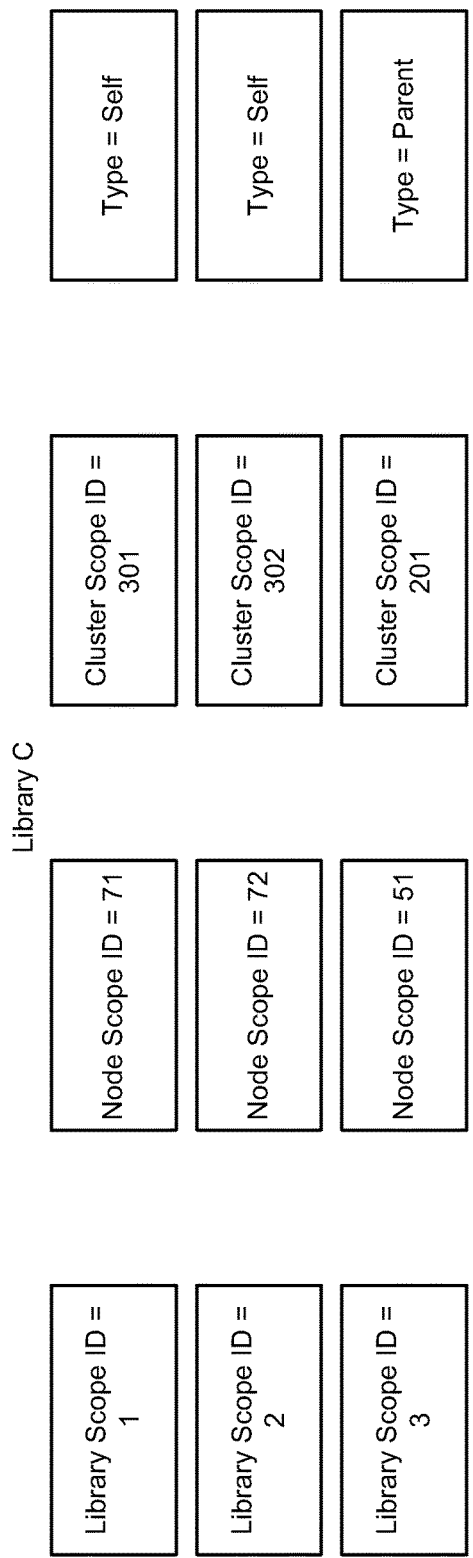
Figure 6F:
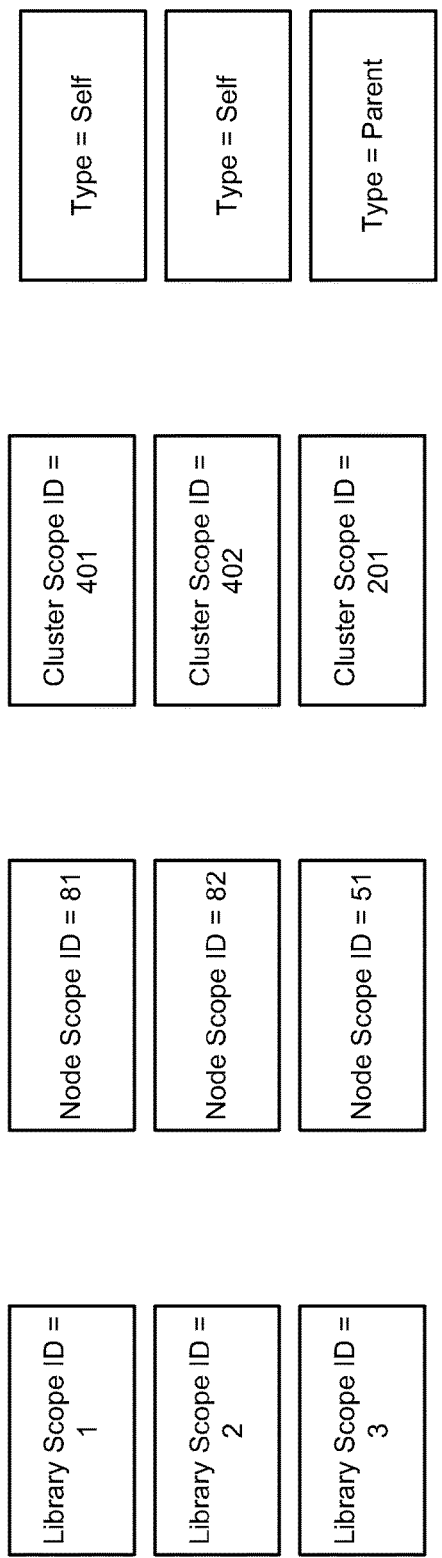
Figure 6G:
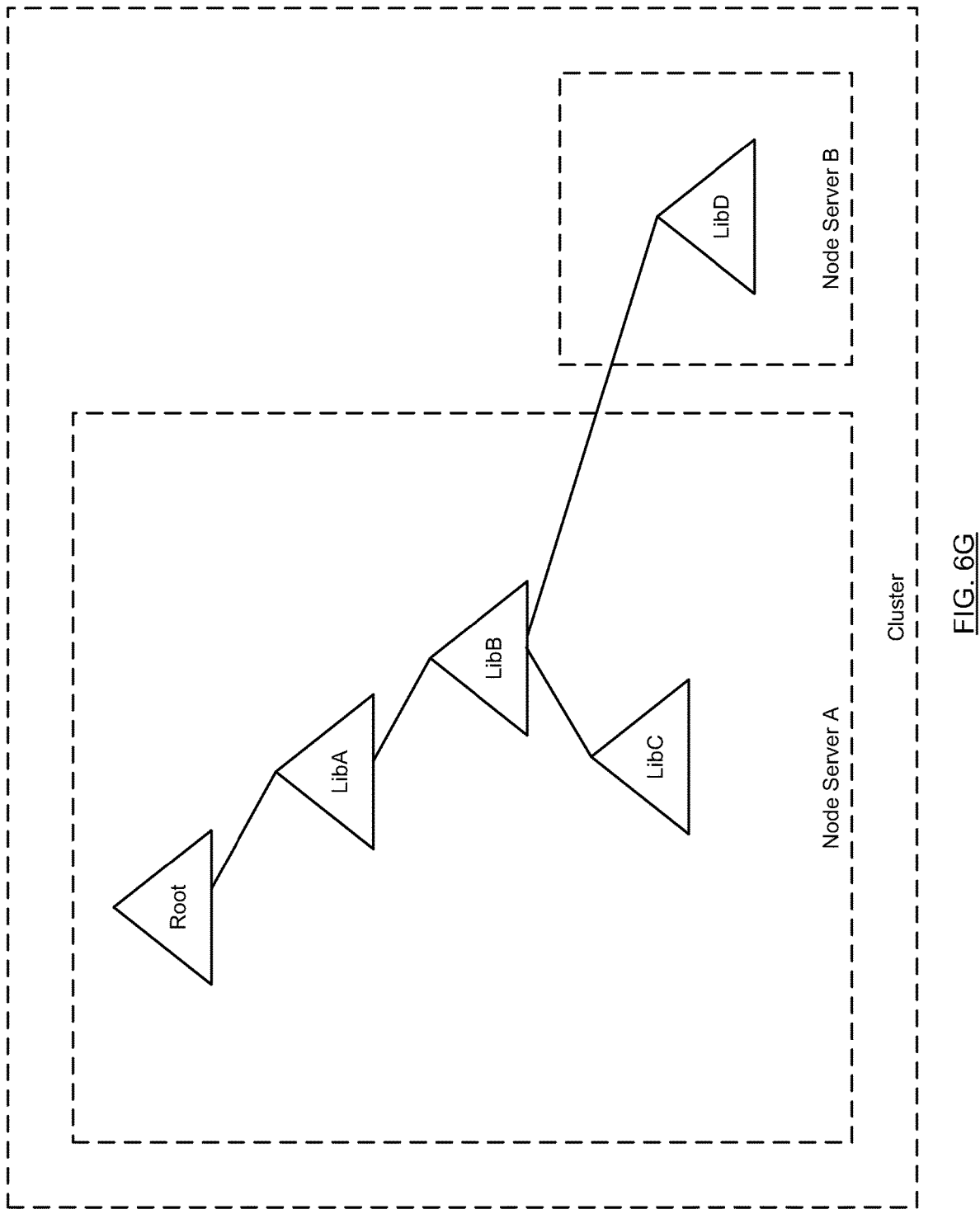
Figure 6H:
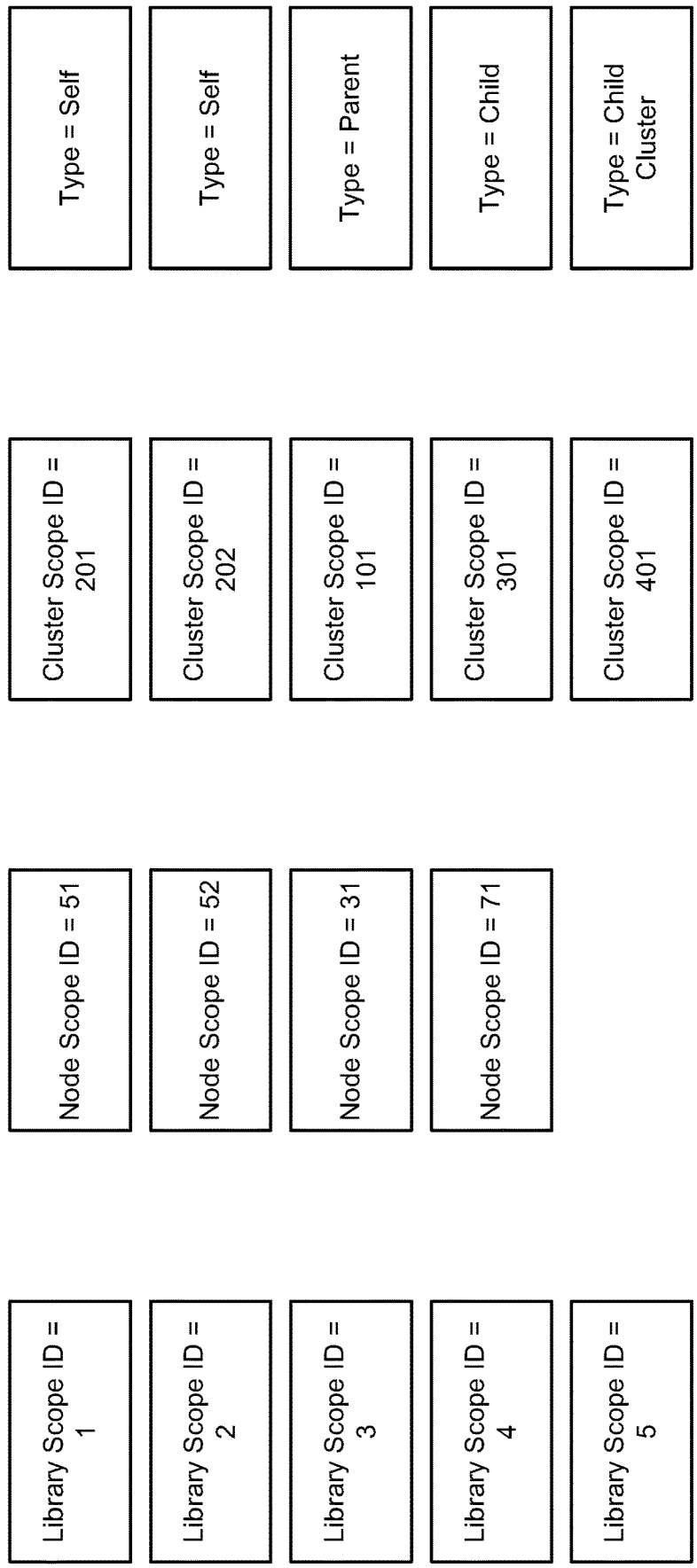
Figure 6I:
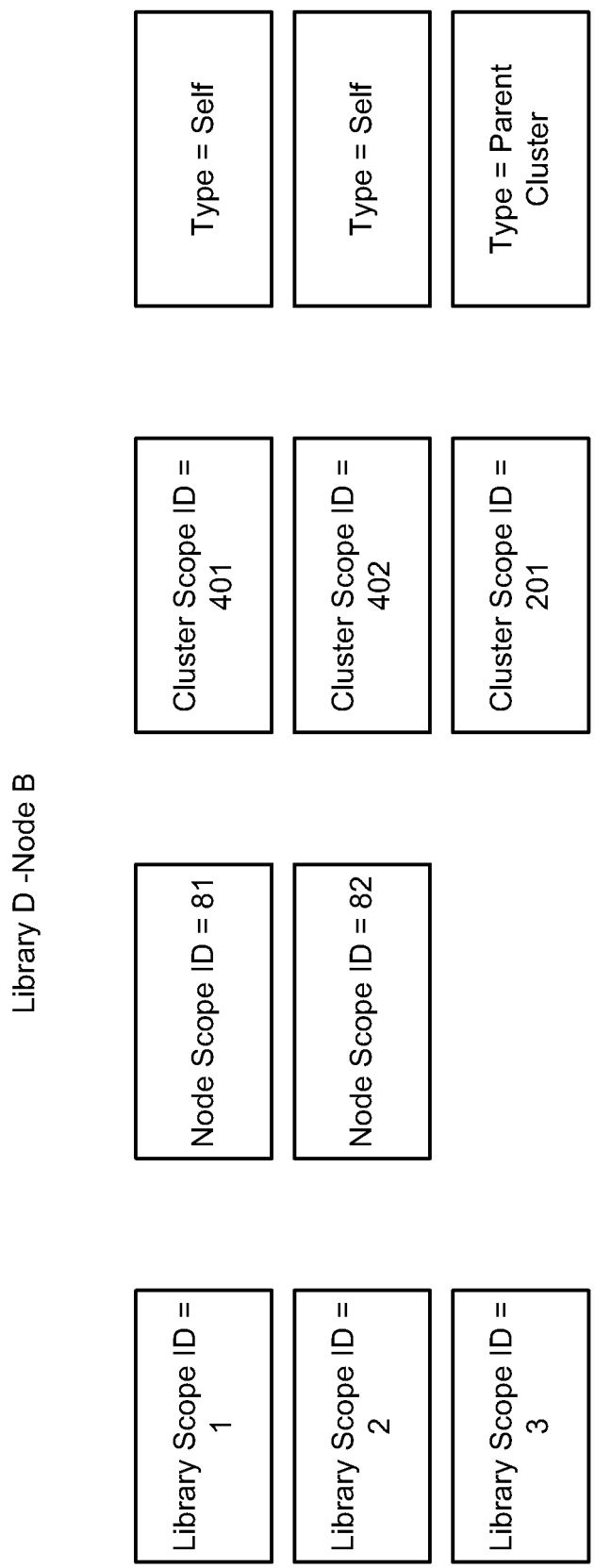
Figure 7:
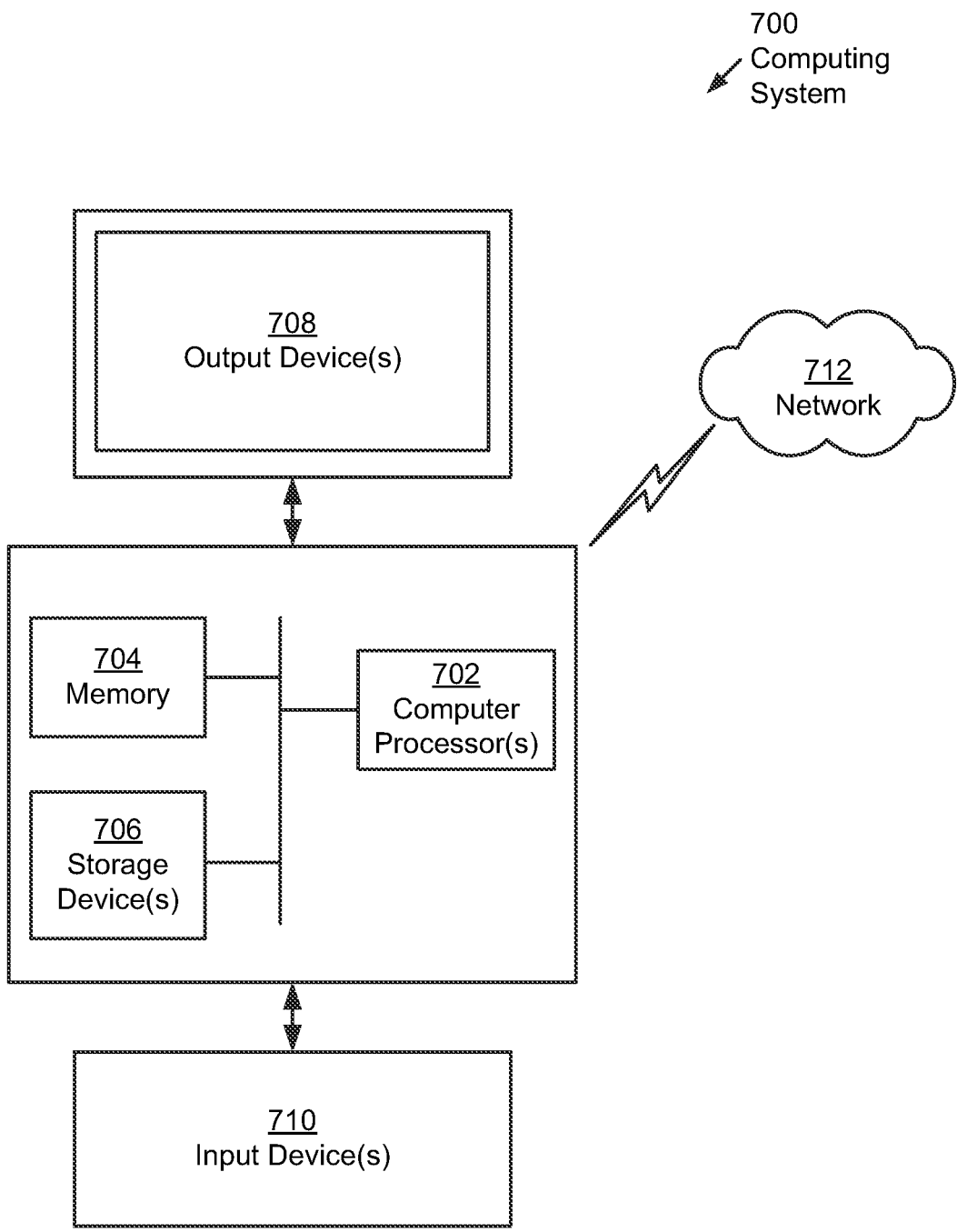
FIG. 7 shows a computing system in accordance with one or more embodiments of the technology.

Each node server (102A, 102B) may be implemented using one or more computing systems (see e.g., FIG. 7). Additional detail about the operation of the nodes is provided in FIGS. 2A, 2D and 3-6J.

In one embodiment of the technology, the storage (104) includes persistent storage (e.g., solid state storage, magnetic storage, optical storage, any other type of persistent storage or any combination thereof) in which libraries are stored.

Continuing with the discussion of the storage, the storage may store libraries (106C, 106D) using any known or subsequently discovered mechanism. The following describes various examples of the mechanisms that may be used to store libraries. The examples are not intended to limit the technology. In a first example, the storage (104) may be a set of magnetic hard disks. In a second example, the storage (104) may be implemented using a computer cluster that is executing a distributed file system. In a third example, the storage (104) may be implemented using a network file server and one or more block-storage devices (i.e., as a Storage Area Network).

Each library (106C, 106D) may include one or more data files (see e.g., FIG. 2B, FIG. 2C) and is accessible via one or more nodes. The data files may be eXtensible Markup Language (XML) files. Data files in other file formats may be used without departing from the technology. Each data file may include references (also referred to as library scope pointers) to other data files in the library and/or references to other data files in other libraries. Those skilled in the art will appreciate that the data files may be stored in the storage in a binary format or any other format supported by the storage media. Additional detail about the data files is described below in FIG. 2C.

In one embodiment of the technology, each library (106C 106D) is bound to a single node server (i.e., is accessible via the node server), while each node server may be bound to multiple libraries. If there are multiple node servers bound to different libraries all associated with the same database instance, then the set of node servers may be referred to as a cluster.

In one embodiment of the technology, the system shown in FIG. 1A is a shared-nothing distributed system. In such embodiments, each node server may only access its own storage. For example, consider a scenario in which the system includes two node servers (e.g., node server 1, node server 2) and four separate storage devices (e.g., storage device 1, storage device 2, storage device 3, and storage device 4). Further, assume that storage devices 1 and 2 are attached to node server 1 and storage devices 3 and 4 are only attached to node server 2. In this scenario, node server 1 may only access the data stored on storage devices 1 and 2 and node server 2 may only access the data on storage devices 3 and 4.

Figure 1B:
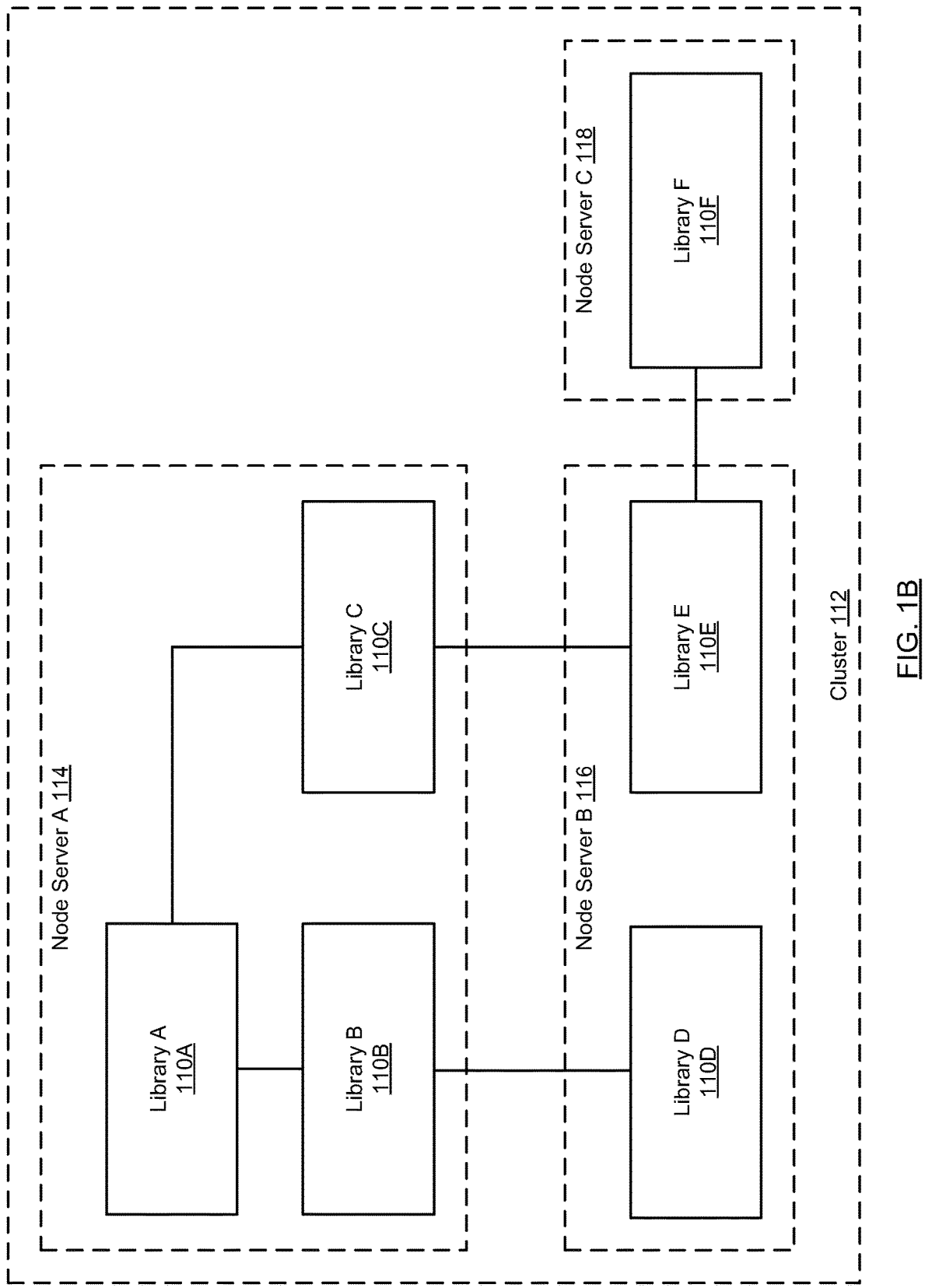
FIG. 1B shows an exemplary cluster in accordance with one or more embodiments of the technology.

FIG. 1B shows an exemplary cluster in accordance with one or more embodiments of the technology. As shown in FIG. 1B, the cluster (112) includes three nodes (114, 116, 118). Node Server A (114) is bound to three libraries (110A, 110B, 110C) arranged in a hierarchical manner, where Library A (110A) is the root Library and Library B (110B) and Library C (110C) are its child libraries. Further, node server B (116) is bound to Library D (110D), which is a child library of Library B (110B), and Library E (110E), which is a child library of Library C (110C). Finally, node server C (118) is bound to Library F (110F), which is a child library of Library E (110E). In one embodiment of the technology, a first library may be designated as a child library of second library if there is a least one pointer (or reference) from a data file in the first library to the second library (or vice versa). In the above example, Libraries A-F are considered to be within the cluster.

The technology is not limited to the architecture of the system shown in FIGS. 1A-1B.

Figure 2A:
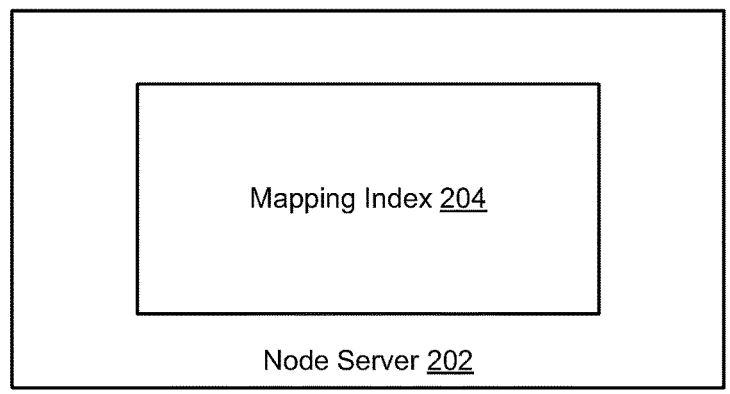
FIGS. 2A-2D show various relationships between components in accordance with one or more embodiments of the technology.

FIGS. 2A-2D show various relationships between components in accordance with one or more embodiments of the technology. Turning to FIG. 2A, in one embodiment of the technology, each node server (200) includes a mapping index (204) which keeps track of the mappings between a library scope ID, a node scope ID, and a cluster scope ID (see e.g., FIG. 2D). The node server may only maintain a mapping index for the libraries to which it is attached. Said another way, the node server may not include a mapping index that covers all data files in all libraries that are attached to any node server in the system; rather, a given node server may only include a mapping index with entries for data files in libraries that it accesses (or is able to access).

In one embodiment of the technology, the library scope ID is assigned to each data file in a library. The library scope ID for a given data file does not change over time (regardless to which database it is attached). Further, the library scope ID uniquely identifies the data file within the library; however, the library scope ID may not be a globally unique ID. Said another way, other data files in other libraries may have the same library scope ID. In one embodiment of the technology, a node scope ID is assigned to a data file by a particular node server (see e.g., FIGS. 3-4). The node scope ID for a given data file in a library may change each time it is attached to a different database. The node scope ID is only unique within the node server (202). Accordingly, the node scope ID may be reused by other node servers that are part of the same cluster.

Figure 3:
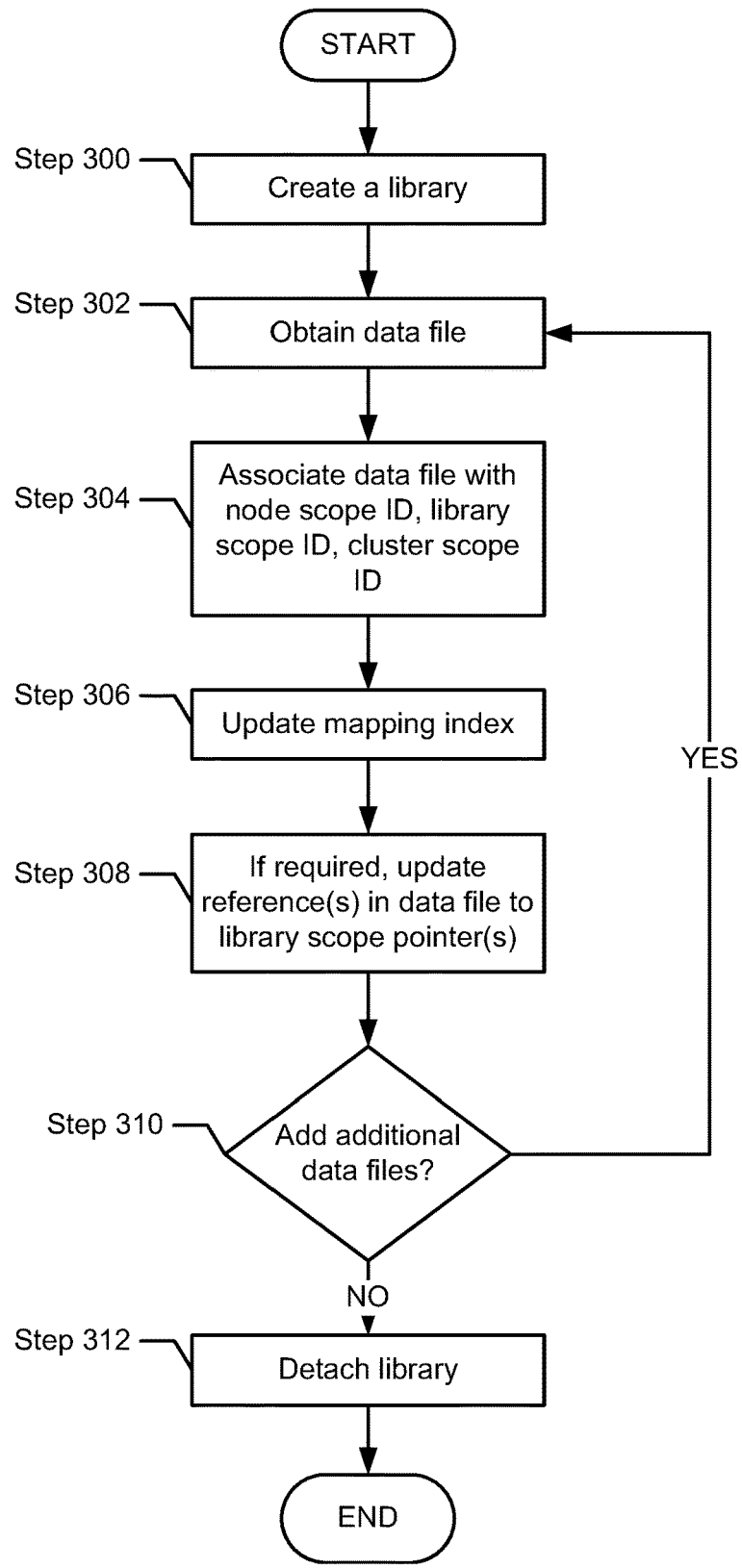
FIG. 3 shows a flowchart for creating a library in accordance with one or more embodiments of the technology.
Figure 4:
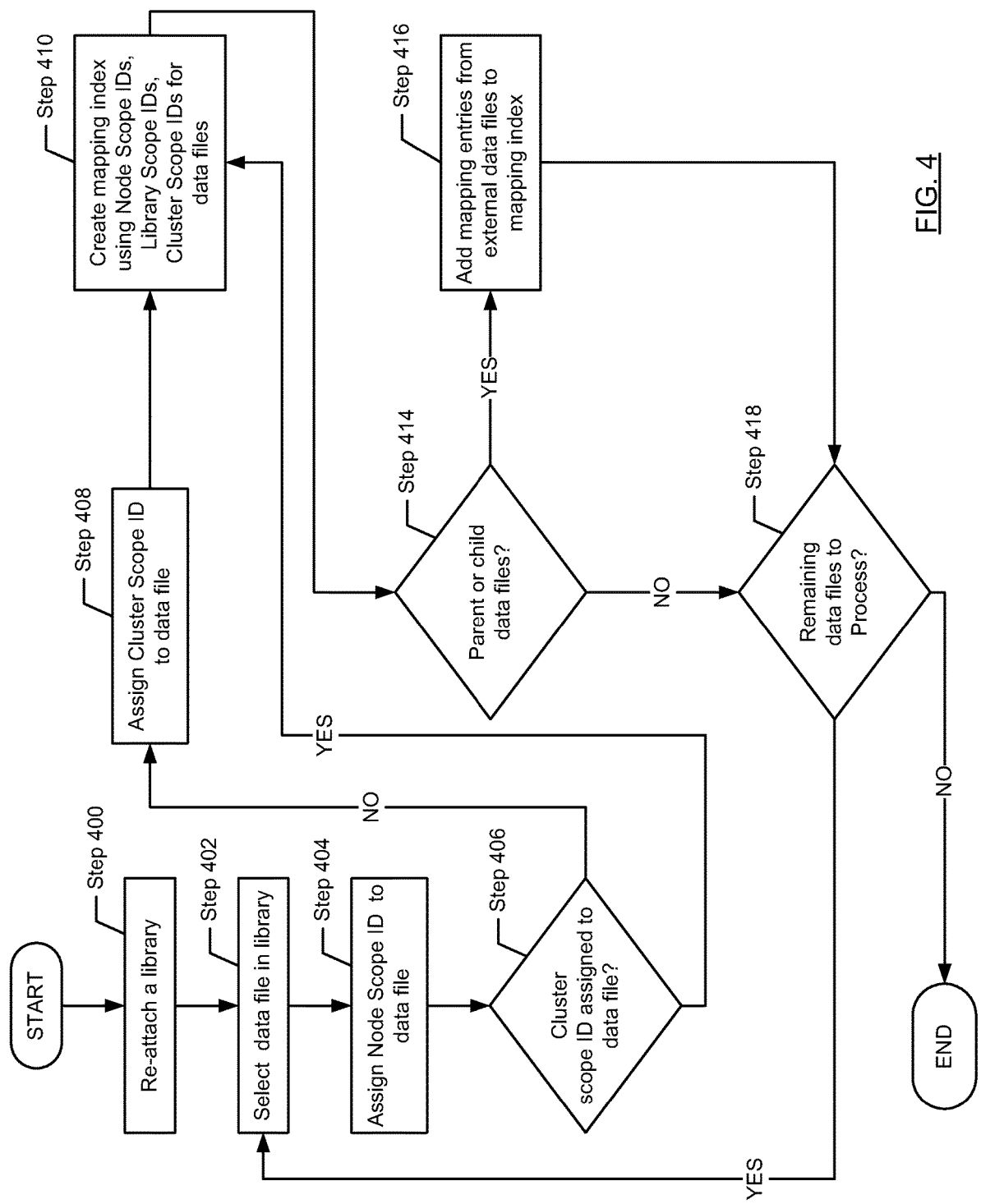
FIG. 4 shows a flowchart for reattaching a detached library in accordance with one or more embodiments of the technology.

In one embodiment of the technology, a cluster scope ID is assigned to a data file by a particular database (or database instance) (see e.g., FIGS. 3-4). The cluster scope ID for a given data file in a library may change each time it is attached to a different cluster; however, the cluster scope ID is unique across all libraries in the cluster.

Figure 2B:
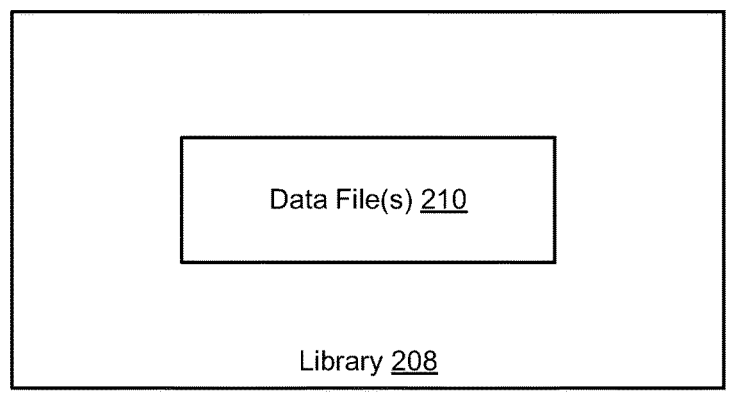
Figure 2C:
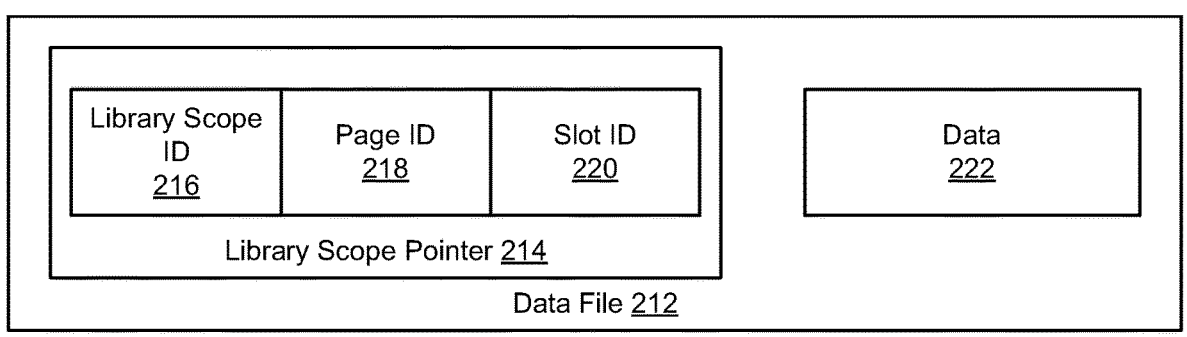

Referring to FIG. 2B, in one embodiment of the technology, each library (208) includes one or more data files (210) and each data file is assigned a library scope ID, the node scope ID, and a cluster scope ID. As discussed above, a data file may reference one or more other data files. The data file uses a library scope pointer to reference other data files. Additional detail about the contents of a data file is shown in FIG. 2C. In one embodiment of the technology, different libraries may assign their own library scope ID to the same underlying data file. Accordingly, a single data file may be associated with multiple library scope IDs.

Referring to FIG. 2C, in one embodiment of the technology, a data file may include one or more library scope pointers (214) and data (222). Each library scope pointer (214) includes three fields: a library scope ID (216) (described above), a page ID (218) and a slot ID (220). The page ID (when multiplied by page size) denotes an offset within a data file and the slot ID denotes a sequence of bytes within that page starting at the offset. In other words, any required data from the data file can be located by the pointer in the form of <library scope ID+page ID+slot ID>.

By using library scope pointers in the library, all references within the library are self-contained and, as such, the library may be readily detached and reattached to a new database while preserving the references within the library. Said another way, because the references in the library are self-contained, the references do not need to be updated when the library is subsequently reattached to another database.

In one embodiment of the technology, the data (222) may correspond to any type of data including text, images, multimedia content, indexes (see e.g., FIG. 6J), or any combination thereof.

Figure 2D:
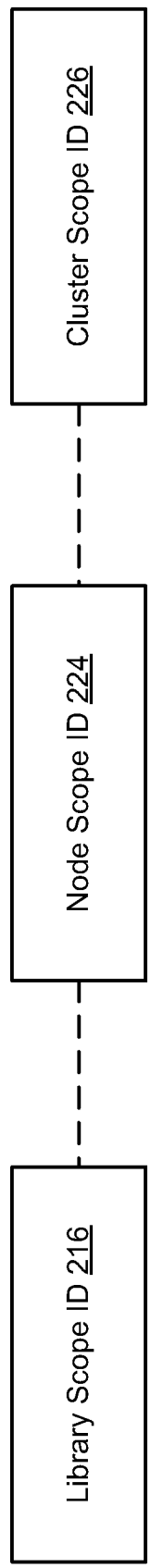

Referring to FIG. 2D, the mapping index (204) includes mapping index entries (MIEs), where each of the MIEs associates the following three IDs: library scope ID (216), node scope ID (224), and cluster scope ID (226). Initially, when a library is attached to a database, the data files in the library are processed (see e.g., FIG. 4) in order to generate the mapping index. The node server may maintain one mapping index per attached library. Alternatively, the node server may maintain a single mapping index, where the node server tracks which mapping index entry is associated with a particular attached library. In addition, though not shown in FIG. 2D, each mapping index entry may be associated with a type. Additional detail about types is provided below.

FIGS. 3-5B show flowcharts in accordance with one or more embodiments of the technology. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

FIG. 3 shows a flowchart for creating and subsequently detaching a library in accordance with one or more embodiments of the technology. FIG. 3 may be performed by a node server.

In step 300, a library is created. The creation of library may include specifying a library name and/or path. At the time the library is initially created, the library may not have any data files.

In step 302, at some point after the creation of the library, a data file is obtained.

In step 304, the data file is associated with a node scope ID, a library scope ID, and a cluster scope ID. The node scope ID is assigned based on the database instance of which this library is a part, the cluster scope ID is assigned based on the cluster of which this node server is a part, and the library scope ID is assigned by the node server (or another process). The node scope ID, the cluster scope ID, and the library scope ID may be assigned using any known or later developed mechanism that ensures no ID collisions. Further, the node scope ID, cluster scope ID, and the library scope ID may include letters, numbers, symbols, or any combination thereof.

In step 306, the mapping index is updated to include the mapping between the library scope ID, the cluster scope ID, and the node scope ID for this data file. In one embodiment of the technology, step 308 may be performed.

Specifically, if the data file that is being added to the library includes a reference(s) that is not a library scope pointer(s), then in step 308, the reference(s) is replaced with a library scope pointer(s). However, if all references in the data file are library scope pointers or the data file does not include any references, then step 308 is not performed. In one embodiment of the technology, if step 308 is performed, it is performed by the node server prior to the data file being stored on the persistent storage.

In step 310, a determination is made about whether there are any additional data files to be added to the library. If there are additional libraries to be added, the process proceeds to step 302; otherwise the process ends. Those skilled in the art will appreciate that steps 302-310 may be repeated for other data files at other points time.

At some later point in time, in step 312, the library is detached. Detaching a library may include physically moving the library to new/different persistent storage. Once a library is detached, it is no longer accessible to any node server until it is subsequently re-attached. The detachable library may be part of a hierarchy of libraries (see e.g., FIGS. 1B, 6A). In such cases, detaching the library includes detaching the library and the corresponding child libraries. For example, with reference to FIG. 1B, detaching Library B may also include detaching Library D.

FIG. 4 shows a flowchart for reattaching a detached library in accordance with one or more embodiments of the technology. The method shown in FIG. 4 may be performed by a node server.

In step 400, a library is reattached to a database. It may be reattached to the same database from which it was detached or to a different database. In one embodiment of the technology, the database may be implemented using one or more node servers. The reattachment of the library in step 400 may correspond to the binding of the library to a node server. Once a library is bound to a node server, the data files within the library may be accessed via the node server.

In step 402, a data file in the library is selected.

In step 404, a new node scope ID is assigned to the data file in the library.

In one embodiment of the technology, the new node scope ID is assigned by the node server to which the library is attached. However, as discussed above, the library scope IDs associated with the data files in the library remain the same.

In step 406, a determination is made about whether the data file is already associated with a cluster scope ID. The following example describes a scenario in which the data file may have been previously assigned a cluster scope ID. Turning to the example, consider a scenario in which the library is initially attached to a first node server in the cluster. When the library is initially created or attached to the first node server, the data file in the library is assigned a node scope ID and a cluster scope ID. At some later point in time, the library is detached and moved to a second node server in the cluster. When the library is reattached, the data file in the library is assigned a new node scope ID but retains the previously assigned cluster scope ID as the second node server is within the same cluster as the first node server. Returning to FIG. 4, if the data file is already associated with a cluster scope ID, the process proceeds to step 410; otherwise the process proceeds to step 408.

In step 408, a cluster scope ID is assigned to the data file.

In step 410, a mapping index entry is created (or updated) using the node scope ID, the cluster scope ID, and the library scope ID associated with the selected data file. The mapping index entry created in step 410 may be associated with a type of self.

In step 414, a determination is made about whether the data file includes a reference to a data file that is in a different library (located on the same node server or a different node server within the cluster). For example, referring to FIG. 6A, a data file in Lib B may include a reference to a data file in Lib A. In this scenario, the data file in Lib A is a parent of the data file in Lib B (also referred to as a parent data file). Similarly, a data file in Lib B may reference a data file in Lib C. In this scenario, the data file in Lib C is a child of the data file in Lib B (also referred to as a child data file). Accordingly, the mapping index created (or updated) in step 404 may also include a mapping index entry for each of the parent data files and each of the child data files.

Continuing with the discussion of FIG. 4, if the data file (i.e., the data file selected in step 402) includes an external reference and/or is referenced by a data file in a different library, then the process proceeds to step 416; otherwise, the process proceeds to step 418.

In step 416, one or more mapping index entries are adding to the mapping index, where each of the mapping index entries corresponds to a data file in a library that is different than the library in which the data file (i.e., the data file selected in step 402) is stored. Each mapping index entry generated in step 416 corresponds to a data file and may be associated with one of the following types: (i) parent—if the data file is located on the same node as the selected data file (i.e., the data file selected in step 402) and is a parent data file of the selected data file; (ii) child—if the data file is located on the same node as the selected data file (i.e., the data file selected in step 402) and is a child data file of the selected data file; (iii) parent cluster—if the data file is located on a different node than the selected data file (i.e., the data file selected in step 402) and is a parent data file of the selected data file; and (iv) child cluster—if the data file is located on a different node than the selected data file (i.e., the data file selected in step 402) and is a child data file of the selected data file. In one embodiment of the technology, if the type of the mapping index entry is either child cluster or parent cluster, then the mapping index entry does not include a node scope ID (see e.g., FIGS. 6H, 6I)

In step 418, a determination is made about whether there are any additional data files to process in the library. If there are additional data files to process, the method proceeds to step 402; otherwise, the method ends.

Figure 5A:
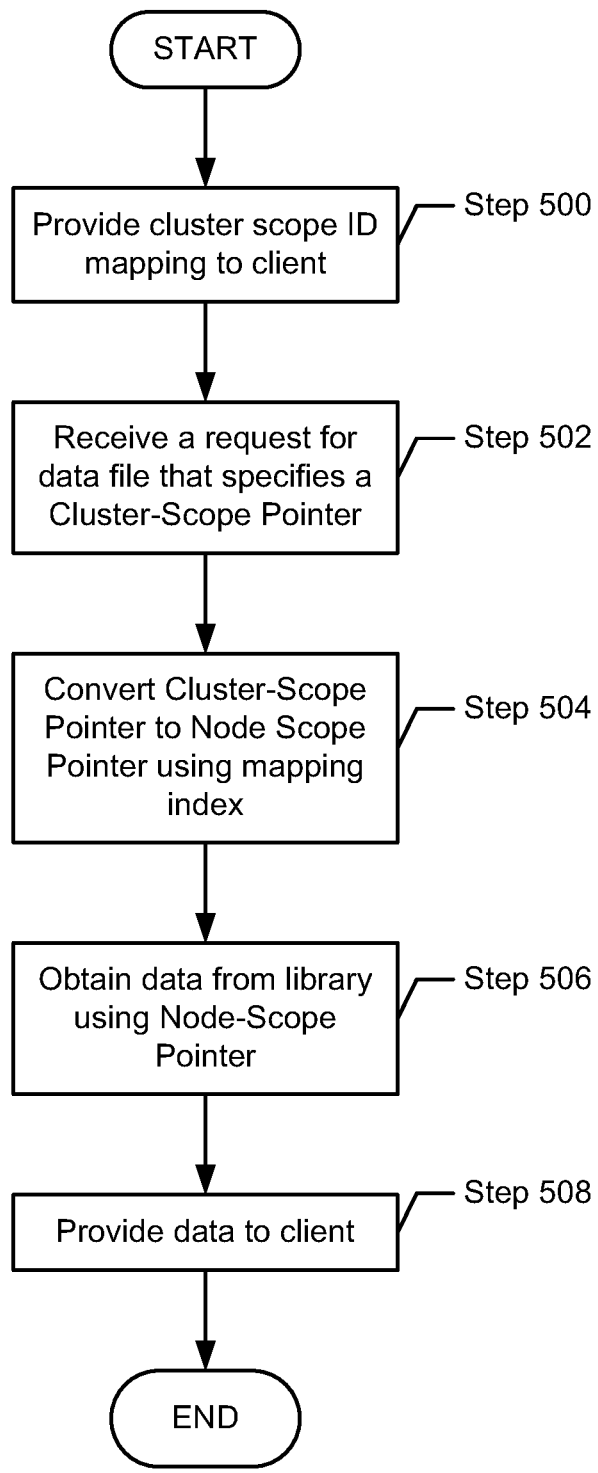
FIGS. 5A-5B show flowcharts for processing requests in accordance with one or more embodiments of the technology.

FIG. 5A shows a flowchart for processing a request in accordance with one or more embodiments of the technology. FIG. 5A is from the perspective of a node server.

In step 500, a cluster scope ID mapping is provided to a client. In one embodiment of the technology, the cluster scope ID mapping is the mapping between cluster scope IDs and library scope IDs. The cluster scope ID mapping may be derived and/or generated using the aforementioned mapping index. Prior to the client sending the request in step 502, the client obtains the cluster scope ID mapping from a node server. In one embodiment of the technology, the cluster scope ID mapping includes an entry for each data file that is accessible via the node server. Accordingly, the cluster scope ID mapping includes entries for all data files that are stored in a library that is accessible by the node server as well as entries for any parent and/or child data files for any of the data files stored in a library that is accessible by the node server. In one embodiment of the technology, the cluster scope ID mapping may be updated as the libraries are attached to the cluster, detached from the cluster, and/or moved between node servers in the cluster. In one embodiment of the technology, the client may include multiple cluster scope ID mappings. Further, the client may track the node server from which each cluster scope ID mapping was obtained.

In step 502, a request for data (while may be the entire data file or part of data file) which specifies a cluster scope ID pointer is received from a client (i.e., a pointer such as the one shown in FIG. 2C, except the pointer includes a cluster scope ID instead of a library scope ID).

The following is an example of how the client (or a driver on the client) may issue a request to the node server. Initially, the client may obtain a library scope pointer from a data file (e.g., a data file previously obtained from a library in the cluster). The library scope pointer is subsequently converted to a cluster scope pointer using the cluster scope ID mapping, which maps library scope IDs to cluster scope IDs. A request that includes the generated cluster scope pointer is then issued to the node server. In one embodiment of the technology, the node server that receives the request corresponds to the node server that provided the data file from which the library scope pointer was obtained. In one embodiment of the technology, the client includes an application and a client driver. In this scenario, the application may issue queries to the node server, where the query is specified using any known or later discovered query language. The query is subsequently received by the client driver. The client driver may then convert the query in to one or more requests, where the request includes cluster scope pointers (and/or cluster scope IDs). In this scenario, the application is not aware of any of the IDs that are used by the node server or any of the attached libraries.

Continuing with the discussion of FIG. 5A, in step 504, the cluster scope pointer is converted to node scope pointer using the mapping index. As discussed above, when a library is attached to a node server, the node server assigns each data file in the library a node scope ID. The node scope ID enables the node server to access the data file in the attached library. Continuing with the discussion of FIG. 5A, the cluster scope pointer is in the form of <cluster scope ID+page ID+slot ID>. By using the mapping index, the cluster scope ID is converted to node scope ID. Then the node scope pointer is obtained in the form of <node scope ID+page ID+slot ID>.

In certain scenarios, the data that is being requested (i.e., the data that is associated with the cluster scope pointer) is not accessible via the node server that received the request in step 502. For example, the data being requested may correspond to a data file that is a parent data file located in a library that is bound to a different node server. For example, referring to FIG. 1B, node server C (118) may receive a cluster scope pointer that is associated with a data file in library E (110E) which is only accessible via node server B (116).

In such instances, the node server which received the request in step 502 may use the cluster scope ID in the request to identify a mapping index entry, where the mapping index entry includes the cluster scope ID and has a type of either parent cluster or child cluster. Upon determining that the type of the mapping index entry is parent cluster or child cluster, the node server may send back information to the client that the requested data file is accessible via a second node server. Upon receipt of this information, the client may reissue the request with the same cluster scope ID to the second node server. The second node server, upon receipt of the request, uses the mapping index located on the second node server to convert the cluster scope ID to the appropriate node scope ID.

In step 506, the requested data is obtained from the library using the node scope pointer. The node scope pointer is the physical data pointer in the database instance. Every single item of data in the library can be located using the physical data pointer (also referred to as node scope pointer). More specifically, the node server uses the node scope pointer to obtain the requested data.

In step 506, the obtained data is provided to the client system that issued the request.

Figure 5B:
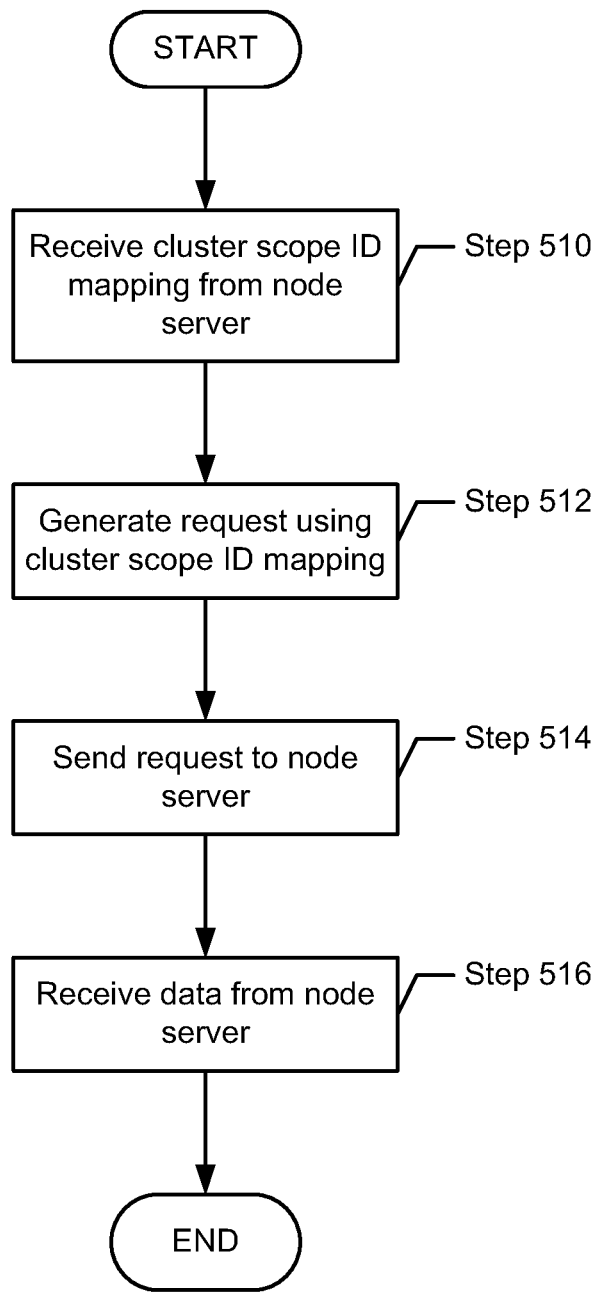

FIG. 5B shows a method for issuing a request to a node server in accordance with one or more embodiments of the technology. FIG. 5B is from the perspective of a client.

In step 510, a cluster scope ID mapping is received from a node server.

The cluster scope ID mapping may be received, for example, in response to a request to connect to the node server. The client may maintain information which indicates from which node server the cluster scope ID mapping was received.

In step 512, at some point in time after step 510, the client may generate a request that includes a cluster scope ID. Generating the request may include: (i) obtaining a library scope pointer, (ii) identifying a node server associated with the library scope pointer; (iii) obtaining the cluster scope ID mapping associated with the identified node server; (iv) obtaining, using the cluster scope ID mapping, a cluster scope ID that corresponds to the library scope ID in the library scope pointer; and (v) generating the cluster scope pointer using the cluster scope ID obtained in (iv).

In step 514, the request is issued to a node server. In step 516, the node server subsequently receives the requested data.

The following is a non-limiting example of the method shown in FIG. 5B. The example is not intended to limit the scope of the technology. Turning to the example, referring to FIG. 1B, consider a scenario in which the client received a data file stored on library E (110E) from node server B (116), extracted a library scope pointer from the data file, and converted the library scope pointer to a cluster scope pointer using a cluster scope ID mapping obtained from node server B (116). In this scenario, the request that includes the cluster scope pointer is sent to node server B (116).

In one embodiment of the technology, if the node server that received the request is not able to directly access the requested data (e.g., the requested data is only accessible via a different node server in the cluster), then step 516 may include receiving a reference (or other information) that may be used to re-issue the request (i.e., the request in step 514) to a node server that can access the requested data.

FIGS. 6A and 6J show an example in accordance with one or more embodiments of the technology. The example is not intended to limit the scope of the technology.

FIG. 6A shows the tree hierarchy before Library D is detached and reattached to a different node server. In this example, the root library (denoted as root) has one data file (not shown) with library scope ID of 1, node scope ID of 11, a cluster scope ID of 001, and a type of self. The mapping index of the root library is shown in FIG. 6B.

Continuing with the discussion of FIG. 6A, library A (denoted as Lib A) has two data files (not shown). The first data file is associated with the following IDs: (i) library scope ID=1, (ii) node scope ID=31, (iii) cluster scope ID=101. The second data file is associated with the following IDs: (i) library scope ID=2, (ii) node scope ID=32, (iii) cluster scope ID=102. In addition, the first data file in Library A has a reference to a parent data file, which is the data file located in the root Library. The parent data file, within the context of Library A, is associated with the following IDs: (i) library scope ID=3, (ii) node scope ID=11, (iii) cluster scope ID=001. Because the parent data file is not located in Library A, the parent data file is associated with a different library scope ID in the mapping index associated with the Library A as compared to the mapping index associated with the same data file in the root Library (i.e., the mapping index shown in FIG. 6C). For example, in the mapping index in the root Library, the data file is associated with library scope ID=1, while the data file (which is denoted as parent data file to the first data file in Library A) is associated with library scope ID=3 in the mapping index associated with Library A. Finally, the first data file in Library A has a reference to a child data file in Library B. Accordingly, the IDs associated with the child data file are: (i) library scope ID=4, (ii) node scope ID=51, (iii) cluster scope ID=201. The mapping index of Library A is shown in FIG. 6B. As shown in FIG. 6C, the mapping index includes four mapping index entries, one entry for each of the data files stored in library A (denoted with type=Self), one entry for the parent data file (denoted by type=parent) and one entry for the child data file (denoted by type=child).

Continuing with the discussion of FIG. 6A, library B (denoted as Lib B) has two data files (not shown). The first data file is associated with the following IDs: (i) library scope ID=1, (ii) node scope ID=51, (iii) cluster scope ID=201. The second data file is associated with the following IDs: (i) library scope ID=2, (ii) node scope ID=52, (iii) cluster scope ID=202. In addition, the first data file in Library B has a reference to a parent data file, which is the first data file located in Library A. The parent data file, within the context of Library A, is associated with the following IDs: (i) library scope ID=3, (ii) node scope ID=31, (iii) cluster scope ID=101. Because the parent data file is not located in Library B, the parent data file is associated with a different library scope ID in the mapping index associated with the Library B as compared to the mapping index associated with the same data file in Library A (i.e., the mapping index shown in FIG. 6C). For example, in the mapping index in Library A, the data file is associated with library scope ID=1, while the data file (which is denoted as parent data file to the first data file in Library B) is associated with library scope ID=3 in the mapping index associated with Library B. Finally, the first data file in Library B has a reference to a child data file in Library C and a reference to a child data file in Library D. Accordingly, the IDs associated with the child data files are as follows: for child data file in Library C, (i) library scope ID=4, (ii) node scope ID=71, (iii) cluster scope ID=301 and for child data file in library D, (i) library scope ID=5, (ii) node scope ID=81, (iii) cluster scope ID=401. The mapping index of Library B is shown in FIG. 6D. As shown in FIG. 6D, the mapping index includes five mapping index entries, one entry for each of the data files stored in library B (denoted with type=Self), one entry for the parent data file (denoted by type=parent) and one entry for each of the child data files (denoted by type=child).

Continuing with the discussion of FIG. 6A, Library C (denoted as Lib C) has two data files (not shown). The first data file is associated with the following IDs: (i) library scope ID=1, (ii) node scope ID=71, (iii) cluster scope ID=301. The second data file is associated with the following IDs: (i) library scope ID=2, (ii) node scope ID=72, (iii) cluster scope ID=302. In addition, the first data file in Library C has a reference to a parent data file, which is the parent data file located in Library B. The parent data file, within the context of Library C, is associated with the following IDs: (i) library scope ID=3, (ii) node scope ID=51, (iii) cluster scope ID=201. Because the parent data file is not located in Library C, the parent data file is associated with a different library scope ID in the mapping index associated with the Library C as compared to the mapping index associated with the same data file in Library B (i.e., the mapping index shown in FIG. 6D). For example, in the mapping index in library B, the data file is associated with library scope ID=1, while the data file (which is denoted as parent data file to the first data file in Library C) is associated with library scope ID=3 in the mapping index associated with Library C. The mapping index of Library C is shown in FIG. 6E. As shown in FIG. 6E, the mapping index includes three mapping index entries, one entry for each of the data files stored in Library C (denoted with type=Self) and one entry for the parent data file (denoted by type=parent).

Continuing with the discussion of FIG. 6A, library D (denoted as Lib D) has two data files (not shown). The first data file is associated with the following IDs: (i) library scope ID=1, (ii) node scope ID=81, (iii) cluster scope ID=401. The second data file is associated with the following IDs: (i) library scope ID=2, (ii) node scope ID=82, (iii) cluster scope ID=402. In addition, the first data file in Library C has a reference to a parent data file, which is the parent data file located in Library B. The parent data file, within the context of Library D, is associated with the following IDs: (i) library scope ID=3, (ii) node scope ID=51, (iii) cluster scope ID=201. Because the parent data file is not located in Library D, the parent data file is associated with a different library scope ID in the mapping index associated with the Library D as compared to the mapping index associated with the same data file in Library B (i.e., the mapping index shown in FIG. 6D). For example, in the mapping index in Library B, the data file is associated with library scope ID=1, while the data file (which is denoted as parent data file to the first data file in Library D) is associated with library scope ID=3 in the mapping index associated with Library D. The mapping index of Library D is shown in FIG. 6F. As shown in FIG. 6F, the mapping index includes three mapping index entries, one entry for each of the data files stored in Library D (denoted with type=Self) and one entry for the parent data file (denoted by type=parent).

Referring to FIG. 6G, consider a scenario in which Library D is moved to node server B. As discussed above, the library scope IDs associated with the data files in Library D will not change when Library D is moved to node server B. Further, because node server B is in the same cluster as node server A, the cluster scope IDs associated with the data files in Library D will also not change; however, the node scope IDs associated with the data files will change. FIG. 6H shows the resulting mapping index entries for Library B after Library D is moved to node server B and FIG. 6I shows the resulting mapping index entries for Library D after it is moved (or reattached attached) to node server B.

Referring to FIG. 6H, the only mapping index entry that changes when Library D is moved is the mapping index entry corresponding to the data file on Library D. In this example, the mapping index entry with a library scope ID=5 is updated to remove the node scope ID and to indicate that the type of entry has changed from child to child cluster. As discussed above, this indicates that the data file corresponding to this mapping index entry is located in library that is stored on a different node server than Library B.

Referring to FIG. 6I, once Library D is stored on node server B, a mapping index is created. The resulting mapping index is shown in FIG. 6I. The mapping index includes one entry for each of the data files (not shown) that is stored in Library D. These entries include the same library scope IDs and cluster scope IDs that were present in the mapping index for Library D prior to it being moved to node server B; however, the data files are assigned new node scope IDs because they are now associated with a new node server. Finally, the mapping index includes an entry corresponding to the parent data file located in Library B. The mapping index entry for the parent data file includes the same library scope ID and cluster scope ID that was present in the mapping index entry for the parent data file prior to Library D being moved to node server B; however, the entry corresponding to the parent data file does not include a node scope ID because the data file corresponding this entry is not accessible via Node Server B. Further, the type associated with this entry is parent cluster, which indicates that the parent data file corresponding to this mapping index entry is located on a library that is accessible via a different node server than Library D.

Referring to FIG. 6J, in one embodiment of the technology, a mapping index may be stored in its associated library. In such cases, the stored mapping index (also referred to as a stored index) includes the same content as the mapping index maintained by the node server. The stored index may also include entries for all referenced data files that are in any library which is a descendant of the library in which the stored index is being stored. For example, referring to FIG. 6J, the stored index corresponds to the stored index for Library B. The stored index includes entries corresponding to the five mapping index entries shown in FIG. 6D. In addition, the stored index includes entries for all other data files that are present in any descendant library. In this example, two additional entries are included. These entries are denoted with type tree. In one embodiment of the technology because a given data file in a library may reference a descendent data file that is in a descendent library (e.g., in a great grandchild library), the index includes entries for all data files in all descendent libraries of the library in order to enable resolution of any library scope pointer for a descendent data file.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor (s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (700) may be located at a remote location and connected to the other elements over a network (714). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for servicing data requests, comprising:
    obtaining a detachable library, wherein the detachable library comprises a plurality of data files and each of the plurality of data files comprises a library scope identifier (ID), and wherein library scope IDs are unique within the detachable library;
    reattaching the detachable library to a node server;
    assigning a node scope ID and a cluster scope ID to each of the plurality of data files in the reattached detachable library, wherein node scope IDs are unique within all libraries attached to the node server and the cluster scope IDs are unique across all node servers in a cluster, wherein the cluster comprises multiple node servers bound to different libraries associated with a same database instance;
    creating a mapping index using the node scope IDs, the cluster scope IDs, and the library scope IDs, wherein each mapping index entry in the mapping index is associated with a type determined based on at least one of storage locations or hierarchical relationships of the plurality of data files;
    processing a request for a data file from a client using the mapping index, wherein the request comprises a cluster scope ID; and
    providing the requested data file to the client in response to the request.

2. The method of claim 1, further comprising:
    prior to the obtaining of the detachable library:
        creating a library;
        obtaining the plurality of data files; and
        detaching the library to obtain the detachable library.

3. The method of claim 1, wherein the processing of the request comprises:
    receiving the request for the data file from the client, wherein the request specifies a cluster scope pointer comprising the cluster scope ID;
    converting the cluster scope pointer to a node scope pointer using the mapping index, wherein the node scope pointer includes a node scope ID corresponding to the cluster scope ID; and
    obtaining the data file from the detachable library using the node scope pointer.

4. The method of claim 3, wherein the data file comprises an eXtensible Markup Language (XML) document.

5. The method of claim 3, wherein the data file comprises a library scope pointer and does not comprise any cluster scope pointers.

6. The method of claim 1, further comprising:
    prior to the processing of the request:
        providing a cluster scope ID mapping to the client, wherein the cluster scope ID mapping comprises a mapping between the cluster scope IDs and the library scope IDs.

7. The method of claim 1, wherein the mapping index is stored in the node server.

8. The method of claim 1, wherein the library is stored in persistent storage.

9. A system, comprising:
    persistent storage comprising a library;
    a node server coupled to the storage and programmed to:
        obtain a detachable library, wherein the detachable library comprises a plurality of data files and each of the plurality of data files comprises a library scope identifier (ID), and wherein library scope IDs are unique within the detachable library;
        reattach the detachable library to a node server;
        assign a node scope ID and a cluster scope ID to each of the plurality of data files in the reattached detachable library, wherein node scope IDs are unique within all libraries attached to the node server and cluster scope IDs are unique across all node servers in a cluster, wherein the cluster comprises multiple node servers bound to different libraries associated with a same database instance;
        create a mapping index using the node scope IDs, the cluster scope IDs, and the library scope IDs, wherein each mapping index entry in the mapping index is associated with a type determined based on at least one of storage locations or hierarchical relationships of the plurality of data files; and
        process a request for a data file from a client using the mapping index, wherein the request comprises a cluster scope ID; and
        provide the requested data file to the client in response to the request.

10. The system of claim 9, wherein the node server is further programmed to:
    prior to the obtaining of the detachable library:
        create a library;
        obtain the plurality of data files; and
        detach the library to obtain the detachable library.

11. The system of claim 9, wherein the processing of the request comprises:
    receiving the request for the data file from the client, wherein the request specifies a cluster scope pointer comprising the cluster scope ID;
    converting the cluster scope pointer to a node scope pointer using the mapping index, wherein the node scope pointer include a node scope ID corresponding to the cluster scope ID; and
    obtaining the data file from the detachable library using the node scope pointer.

12. The system of claim 11, wherein the data file comprises an eXtensible Markup Language (XML) document.

13. The system of claim 11, wherein the data file comprises a library scope pointer and does not comprise any cluster scope pointers.

14. The system of claim 9, wherein the node server is further programmed to:
    prior to the processing of the request:
        providing a cluster scope ID mapping to the client, wherein the cluster scope ID mapping comprises a mapping between the cluster scope IDs and the library scope IDs.

15. A non-transitory computer readable medium comprising computer readable program code, which when executed by a computer processor enables the computer processor to perform a method for servicing requests, the method comprising:
    obtaining a detachable library, wherein the detachable library comprises a plurality of data files and each of the plurality of data files comprises a library scope identifier (ID), and wherein library scope IDs are unique within the detachable library;
    reattaching the detachable library to a node server;
    assigning a node scope ID and a cluster scope ID to each of the plurality of data files in the reattached detachable library, wherein node scope IDs are unique within all libraries attached to the node server and cluster scope IDs are unique across all node servers in a cluster, wherein the cluster comprises multiple node servers bound to different libraries associated with a same database instance;

creating a mapping index using the node scope IDs, the cluster scope IDs, and the library scope IDs, wherein each mapping index entry in the mapping index is associated with a type determined based on at least one of storage locations or hierarchical relationships of the plurality of data files;

processing a request for a data file from a client using the mapping index, wherein the request comprises a cluster scope ID; and providing the data file to the client in response to the request.

16. The non-transitory computer readable medium of claim 15, the method further comprising:

prior to the obtaining of the detachable library:
creating a library;
obtaining the plurality of data files; and
detaching the library to obtain the detachable library.

17. The non-transitory computer readable medium of claim 15, wherein the processing of the request comprises:

receiving the request for the data file from the client, wherein the request specifies a cluster scope pointer comprising the cluster scope ID;

converting the cluster scope pointer to a node scope pointer using the mapping index, wherein the node scope pointer include a node scope ID corresponding to the cluster scope ID; and obtaining the data file from the detachable library using the node scope pointer.

18. The non-transitory computer readable medium of claim 17, wherein the data file comprises an eXtensible Markup Language (XML) document.

19. The non-transitory computer readable medium of claim 17, wherein the data file comprises a library scope pointer and does not comprise any cluster scope pointers.

20. The non-transitory computer readable medium of claim 15, wherein the method further comprises:

prior to the processing of the request:
providing a cluster scope ID mapping to the client, wherein the cluster scope ID mapping comprises a mapping between the cluster scope IDs and the library scope IDs.

* * * * *

UNITED STATES PATENT AND TRADEMARK OFFICE
CERTIFICATE OF CORRECTION

PATENT NO. : 10,599,717 B1
APPLICATION NO. : 15/281437
DATED : March 24, 2020
INVENTOR(S) : Sikan Chen et al.

Page 1 of 1

It is certified that error appears in the above-identified patent and that said Letters Patent is hereby corrected as shown below:

In the Claims
Column 14, Line 35, Claim 11, the phrase "scope pointer include a" should read -- scope pointer includes a --.
Column 16, Line 6, Claim 17, the phrase "scope pointer include a" should read -- scope pointer includes a --.

Signed and Sealed this
Ninth Day of June, 2020

Andrei Iancu
*Director of the United States Patent and Trademark Office*